Dec. 5, 1939.  S. F. COX  2,182,373
FRANGIBLE BLOCK MOUNTING
Filed Aug. 10, 1938
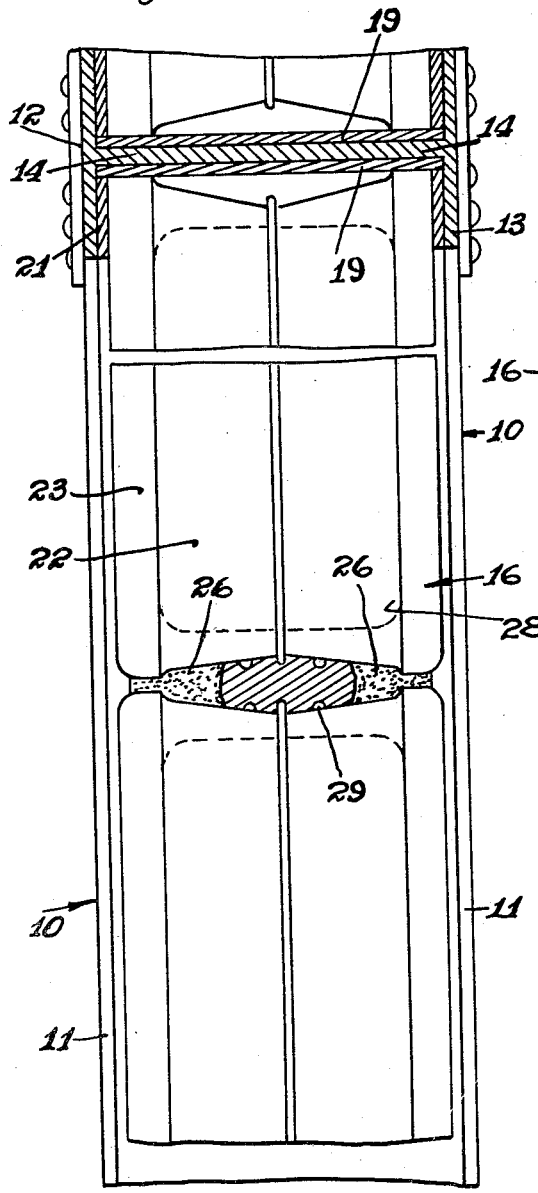
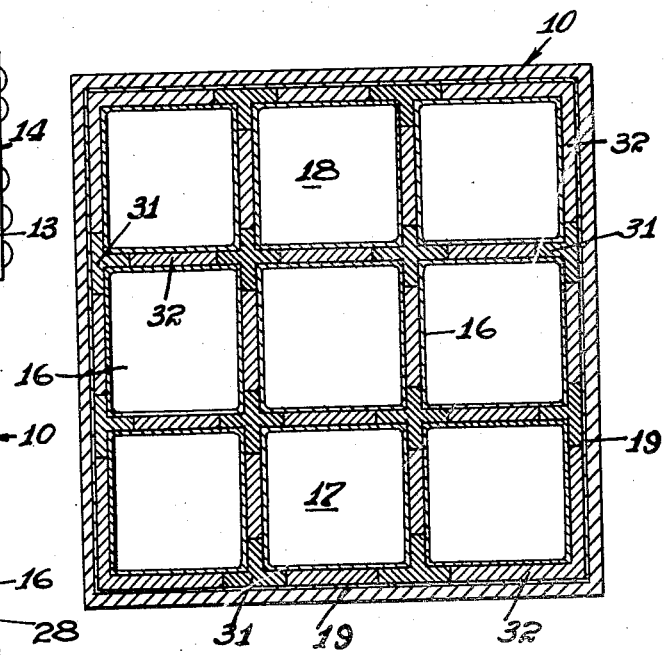
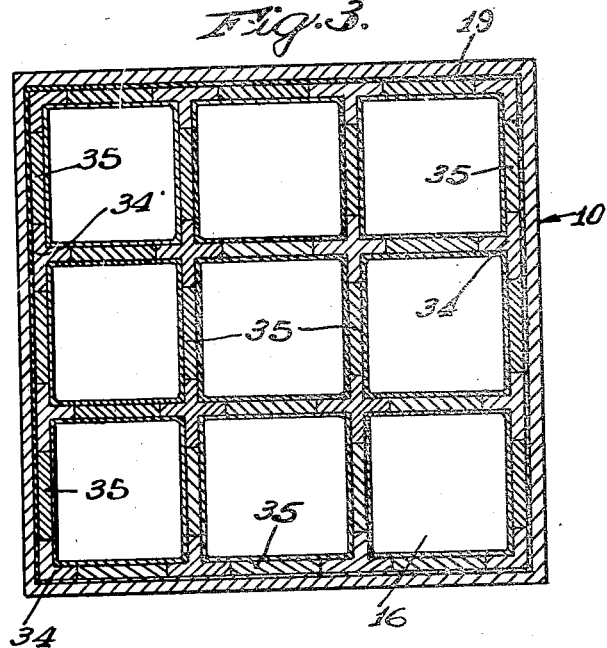
INVENTOR.
SAMUEL F. COX
BY Bradley & Bee
ATTORNEYS.

Patented Dec. 5, 1939

2,182,373

UNITED STATES PATENT OFFICE 2,182,373

FRANGIBLE BLOCK MOUNTING

Samuel F. Cox, Pittsburgh, Pa., assignor to Pittsburgh Plate Glass Company, Allegheny County, Pa., a corporation of Pennsylvania Application August 19, 1938, Serial No. 224,133

4 Claims. (Cl. 72—42)

The present invention relates to methods of setting blocks of building materials in walls and it has particular relation to such methods where the blocks or units are hollow and composed of frangible material.

One object of the invention is to provide a setting for such blocks by application of which the blocks are relatively firmly and securely cemented together against mechanical displacement, but in which excessive stress due to expansion or contraction of the bonding agents between the blocks is obviated.

A second object of the invention is to provide a method of the foregoing type in which heat conductance through the cement between the blocks is substantially reduced.

These and other objects of the invention will be apparent from consideration of the following specifications, and the appended claims.

In conventional masonry or brick construction, the units comprising the walls are laid in courses in abutting relations, and the joints between the different units are filled or sealed by means of a suitable cement such as Portland cement mixed with sand, or with a mortar prepared by mixing sand and lime with water. With solid bricks or stone this type of construction is reasonably satisfactory. However, it is not well adapted for use in connection with walls composed of hollow bricks or blocks of frangible material such as glass or the like. This is true because the mortar tends to bond relatively tenaciously to the glass surface. Furthermore, the mortar when exposed to moisture tends to expand, and when it again dries out it tends to contract. As a result of this expansion and contraction the glass blocks are subjected to compressive or tensional forces which are often aggravated by the fact that ordinary cements have coefficients of thermal expansion considerably greater than that of glass so that the blocks are put under strains due to differences in expansion between the blocks and the mortar in which they are set. Likewise, there is a differential in the rate of heating of the glass and the cement so that a further difference in the degree of expansion is introduced. As a result of these various differentials of expansion, the force exerted upon the hollow blocks often becomes so great as to cause breakage of the latter. This breakage of hollow building units has heretofore constituted a serious problem in the employment of this type of material.

In accordance with the provisions of the present invention, it is proposed to obviate the foregoing difficulties by replacing portions of the conventional cement employed to bond the hollow blocks together at suitable intervals with a more or less plastic or elastic material of the nature of a caulking compound. The cement or mortar maintains the blocks in correctly spaced relation while the plastic material prevents excessive accumulation of forces by reason of a long unbroken body of cement. For a better understanding of the invention, reference may now be had to the accompanying drawing in which like numerals refer to like parts throughout.

Figure 1 is a fragmentary cross-sectional view of a portion of a wall constructed in accordance with the provisions of the present invention.

Figure 2 is a front elevational view of a portion of a wall, further illustrating the principles of the invention.

Figure 3 is a view similar to Figure 2 illustrating a third application of the invention.

In the form of the invention illustrated in Figure 1 a framework or chase 10, comprises upright members 11 and horizontal members 12 of suitable structural iron. In the form illustrated these irons are of channel or I-beam construction, and include flanges 13 connected by transverse webs 14. Hollow glass blocks 16 are disposed within and supported by this framework, and may be arranged as shown in Figures 2 and 3, in horizontal courses 17, and vertical columns or rows 18. The outermost units of each panel or hollow blocks have their edges as shown in Figure 1 secured between the flanges of the framework 10. Preferably the outer edges of these units are cushioned from the intermediate web 14 by means of a layer 19, of cork, felt or other resilient materials. The edge portions may be insulated from the flanges 13 of the structural iron members by means of a suitable caulking material 21.

The glass blocks 16 are of a conventional or common design, and comprise tray-like sections 22, having flanges, or shoulders 23, about their outer peripheries. The sections are fused together along their inner edges to provide a medianly disposed rib 24.

In the form of the invention illustrated in Figure 1 continuous layers 26 of cement of the type of Portland cement or any other suitable cement designed to set up into a strong rigid state are disposed between the edges 23 of the blocks. This cement may also extend a portion of the distance between the main body portions 28 of the blocks, in order to provide sufficient solid bearing surface between contiguous blocks, and also to provide keys preventing the possibility of displacement of the blocks by reason of pressure or force exerted upon the faces thereof. In this form of the invention the space between the two bodies of cement is sealed by means of a continuously extending body of plastic material such as mastics which may be obtained by admixture of asphalt or other organic binder with a filler such as finely divided calcium carbonate or waste sand from the grinding and polishing of glass. If desired, small spaces 29 may be left in the body of the mastic material, in order to admit of expansion and contraction thereof without the exertion of any substantial degree of pressure within the joint between contiguous blocks.

It will be apparent that in this form of the invention the cross-sectional area of the body of cement at any particular point is relatively small, and therefore, the total stress exerted upon the glass blocks or units by reason of the expansion or contraction of the cementing material is relatively small. Likewise, the body of mastic material between the two portions 26, of cement, prevent the possibility of the exertion of any substantial force upon the shoulders 23, tending to disrupt the blocks along the line of fusion between the two halves.

In the applications of the invention disclosed in Figures 2 and 3, the glass block 16 and the framework 19 disposed thereabout are identical with those disclosed in Figure 1 and need not be described. However, in these constructions the alternate bodies of cement and mastics indicated respectively at 31 and 32 extend entirely across the edges of the blocks. In the construction shown in Figure 2 the body 32 of cement supports the intermediate portion of each of the blocks, while the spaces at the corners of the blocks are sealed or packed by means of bodies 31 of mastic material.

In the form of the invention illustrated in Figure 3 the positions of the body of cement and mastics are reversed. In other words, the corner portion of each of the blocks are supported and positively spaced by means of bodies 34 of cement, while the intermediate portion of the joints between the blocks are filled by means of bodies 35 of mastics.

In the constructions herein disclosed, it will be apparent that the bodies of hard non-plastic cement are sufficient to support the glass blocks and to maintain the spacing between the adjacent edges thereof. However, the continuity of the layers of cement in the joints between the blocks is so broken up, that the accumulative differential of expansion between the glass and cement caused by long stretches of uninterrupted cement in the joints is obviated. Accordingly, the forces exerted by the cement upon the glass due to this expansion at any given point is relatively small.

The heat conductivity of the mastic is low and therefore it substantially increases the insulative value of the structure.

Although only certain preferred forms of the invention have been shown and described, it will be apparent to those skilled in the art that these are merely illustrative, and that numerous modifications may be made therein without departure from the spirit of the invention, or the scope of the appended claims.

What I claim is:

1. A building wall comprising hollow blocks of frangible material, the joints between the blocks being filled by alternate masses of relatively hard non-plastic cement and a softer yielding permanently plastic mastic, the cement masses being completely separated by the mastic and the weight of the blocks being carried by the cement.

2. A building wall comprising hollow blocks of frangible material having peripheral channels about their edges, the blocks being set in abutting relation, the joints between the blocks being filled along their edges with a hard non-plastic cement, the intermediate portions of the joints being filled with a mastic caulking material the latter completely separating the portions of cement, the cement carrying the weight of the blocks.

3. A building wall comprising hollow blocks of frangible material set in abutting relation to provide horizontal joints and intersecting vertical joints, the joints at their intersections being filled with a hard non-plastic cement, and portions of the joints intermediate the intersections being filled with a plastic caulking material, the cement being completely broken up into short longitudinally-extending sections by the mastic and the cement bearing the weight of the blocks.

4. A building wall comprising hollow blocks of frangible material set in abutting relation to provide joints extending vertically and intersecting joints extending horizontally, the joints at the intersections being filled with a plastic cement and being filled intermediate of the intersections with a hard non-plastic cement, the cement being completely broken up into short longitudinally-extending sections by the mastic and the cement bearing the weight of the blocks.

SAMUEL F. COX.